United States Patent [19]

Manning

[11] 3,856,881
[45] Dec. 24, 1974

[54] METAL VANADITE CATALYZED OXIDATIVE DEHYDROGENATION PROCESS

[75] Inventor: Harold E. Manning, Houston, Tex.

[73] Assignee: Petro-Tex Chemical Corporation, Houston, Tex.

[22] Filed: Sept. 10, 1973

[21] Appl. No.: 396,033

Related U.S. Application Data

[63] Continuation-in-part of Ser. No. 59,751, July 30, 1970, abandoned.

[52] U.S. Cl. ......... 260/680 E, 252/464, 260/669 R, 260/683.3
[51] Int. Cl. ............................................. C07c 5/18
[58] Field of Search .......... 260/680 E, 683.3, 669 R

[56] References Cited
UNITED STATES PATENTS

| | | | |
|---|---|---|---|
| 2,326,258 | 8/1943 | Schmidt et al. | 260/680 E |
| 3,218,368 | 11/1965 | Neale | 260/683.3 |
| 3,308,191 | 3/1967 | Bajars | 260/680 D |
| 3,308,196 | 3/1967 | Bajars | 260/680 D |
| 3,308,200 | 3/1967 | Bajars | 260/680 D |
| 3,488,402 | 1/1970 | Michaels et al. | 260/680 R |

*Primary Examiner*—Paul M. Coughlan, Jr.
*Attorney, Agent, or Firm*—N. Elton Dry

[57] ABSTRACT

Organic compounds can be oxidatively dehydrogenated using metal vanadite catalysts. For example, butene-2 is dehydrogenated to butadiene over a number of metal vanadites (e.g., Mg, Mn, Co, Zn and Li) in modest to excellent yields. The yield of dehydrogenated product can be improved by the presence of phosphorous in the metal vanadite catalyst, e.g., the yield of butadiene was 45 mole % with a Mg-V catalyst and 50 mole % with a Mg-P-V catalyst under similar conditions of operation. The presence of small quantities of halogen, for example 0.0001 to 0.5 mole per mole of hydrocarbon to be dehydrogenated, produces more improved yields of dehydrogenated product.

19 Claims, No Drawings

METAL VANADITE CATALYZED OXIDATIVE DEHYDROGENATION PROCESS

This application is a continuation-in-part of Ser. No. 59,751 filed July 30, 1970, now abandoned.

The present invention relates to novel oxidative dehydrogenation catalysts and their method of use. More particularly the invention relates to metal vanadites as oxidative dehydrogenation catalysts. The invention also relates to certain modifications of such metal vanadites which further enhance their catalytic properties.

A number of materials have been proposed as oxidative dehydrogenation catalysts, e.g., U.S. Pat. Nos. 3,270,080 (Mg, Zn, Co, Ni ferrites plus P); 3,284,536 (Mg ferrite); 3,303,234 (Sr, Ba ferrites); 3,303,235 (Zn ferrite); 3,303,235 (Ni ferrite); 3,303,238 (Mg, Zn, Co, Ni ferrites plus Si); 3,334,152 (Ca, Co, Cd ferrites); 3,420,912 (Mn ferrite); 3,336,408 (Sb oxide plus oxide of atomic number 22–50, 57 to 83, 90 and 92); 3,456,030 (oxides of Mo, B and Ce); 3,446,869 (Pb molybdate and Al or Co tungstate); 3,320,329 (stannic phosphate); and 3,173,855 and 3,247,278 (molecular sieves).

U.S. Pat. No. 2,325,258 To Schmidt et al. disclosed an oxidative dehydrogenation process using as the catalyst the oxides of the metals of the fifth and sixth group of the Periodic Table and the salts derived from the acids of these metals. Included in this listing were the salts of vanadic acid, i.e., the vanadates. According to Hackle's Chemical Dictionary, 4th Edition, vanadic acid exists in more than just one modification, e.g., meta-$HVO_3$(V = +5);  ortho-$H_3VO_4$(V= +5) and
pyro-$H_4V_2O_7$(V = +5)

In each case the vanadium exhibits a +5 valence, and similarly a vanadate had vanadium at +5 valence. The spinellic compounds of the present invention, however, are incapable of containing vanadium in the +5 oxidation state since a monovalent metal such as Li would be required as a constituent of the spinel[1,2] and as such are excluded in the present invention.

[1] Binary spinels are known of the following types: $Me_{1/2}'\ Me_{5/2}'''\ O_4$, $Me_{4/3}'\ Me_{5/3}''\ O_4$, $Me_2'\ Me^{II}O_4$, $Me''\ Me_2'''\ O_4$, $Me_2''\ M^{II}O_4$, "Saturation Magnetization and Crystal Chemistry of Ferrimagnetic Oxides," E. W. Gorter, Thesis, University of Leyden, June, 1954, Phillips Res. Rep. 9, p. 295–320, 1954, p. 308.

[2] $LiMe^{2+}Me^{3+}O_4$, "Crystal Chemistry and Some Magnetic Properties of Mixed Metal Oxides with Spinel Structure," G. Blasse, Thesis, University of Leiden, April, 1964, Phillips Res. Rep. Supp No. 3 (1964) p. 128–129.

It has now been found that certain vanadium compounds are also excellent oxidative dehydrogenation catalysts.

The catalysts of the present invention contain vanadium, oxygen and at least one other metallic element M. The catalysts comprise spinel crystalline compositions of vanadium, oxygen and at least one other metallic element M. A preferred catalyst of this type is that having a face-centered cubic form of crystalline structure.

An example of this type of face-centered cubic form is vanadites of spinel structure (which derives its name from the mineral $MgAl_2O_4$). In the close-packed array of oxygen ions of the cubic spinel, two types of interstitial sites occur: tetrahedral and octahedral, there being 64 and 32 sites, respectively, of which only 8 and 16, respectively are occupied. The tetrahedral sites are relatively small and generally will not provide sufficient space for the metal ions without expanding the site. This expansion is accomplished in the spinel by a displacement of the four oxygen ions away from the metal ions along the body diagonals of the octants having central metal ions. Whereas the oxygen ions in the "octahedral octant" are displaced in such a way that this oxygen tetrahedron shrinks by the same amount as the metal tetrahedron expands. Thus, cubic symmetry is preserved. Examples of this type of catalyst are spinels of the structure $MV_2O_4$ where M is a divalent metal and vanadium has a valence of +3. Vanadium having a valence of +4 can be substituted for all or part of the +3 valence vanadium so that the general formula for the spinel can be $M_2VO_4$, $MV_2O_4$ or between $MV_2O_4$ and $M_2VO_4$, depending on the degree of substitution. Those spinels possessing the general formula $MV_2O_4$ are normal, whereas those of the formula type $M_2VO_4$ are inverse (i.e., vanadium always occurs on octahedral sites in these materials.) Generally, where there is vanadium having more than one valence the spinel will be a single phase composition having a general formula between $MV_2O_4$ and $M_2VO_4$, however, a physical mixture of $M_2O_4$ and $M_2VO_4$ or a mixture either of these with a composition between $MV_2O_4$ and $M_2O_4$ is also contemplated as within the present invention.

A number of metal vanadites have been prepared and evaluated for their various physical properties by Rogers, et al., J. Phys. Chem. Solids, Pergamon Press, 1963, Great Britain, Vol. 24, p. 347–360 which is hereby incorporated by reference.

The vanadium spinel compositions exhibit a certain type of X-ray diffraction pattern.[3] The present vanadium spinel compositions do not have any sharp X-ray diffraction reflection peaks typical of a highly crystalline material having the same chemical composition. Instead, the present spinel compositions exhibit reflection peaks which are relatively broad. The degree of sharpness of the reflection peak may be measured by the reflection peak band width at half height (W $h/2$). In other words, the width of the reflection peak as measured at one-half of the distance to the top of the peak is the "band width at half height." The band width at half height is measured in units of °2 theta. Techniques for measuring the band widths are discussed, e.g., in Chapter 9 of Klug and Alexander, X-ray Diffraction Procedures, John Wiley and Son, N.Y., 1954. The particular reflection peak used to measure the band width at one-half height is the reflection peak having Miller (hkl) indices of (222). (See, e.g., Chapter of Klug and Alexander, ibid). Applicant does not wish to be limited to any theory of invention in regard to composition activity and X-ray diffraction pattern.

[3] The powder diffraction patterns may be made, e.g., with a Norelco constant potential diffraction unit type No. 12215/0 equipped with a wide range goniometer type No. 42273/0 cobalt tube type No. 32119, proportional counter type No. 57250/1; all coupled to the Norelco circuit panel type No. 12206/53. The cobalt K alpha radiation is supplied by operating the tube at a constant potential of 30 milovolts and a current of 10 milliamperes. An iron filter is used to remove K beta radiation. The detector voltage is 1160 volts and the pulse height analyzer is set to accept pulses with amplitudes between 10 and 30 volts only. Slits used are divergence 1°, receiving .006 inches and scatter 1°. Strip chart recordings for identification are made with a scanning speed of 1/4° per minute, time constant of 4 seconds and a full scale of $10^3$ counts per second. No correction is made for Kα doublet or instrumental broadening of the band widths.

Examples of catalysts are such as vanadites containing vanadium combined with at least one element selected from the group consisting of Mg, Zn, Ni, Co, Mn, Cu, Ag, Cd, Ca, Ba, Sr, Al, Cr, Ti, Zr, Mo, W, Sn, Pb, Bi, Ga, Ce, La, Th, other rare earth elements and mixtures thereof with a preferred group being Mg, Ca, Sr, Ba, Mn, Cr, Co, Ni, Zn, Cd, and mixtures thereof, particularly preferred metals being Mg or Zn. Preferred catalysts would be spinels of the general formula $M_2VO_4$, $MV_2O_4$, between $MV_2O_4$ and $M_2VO_4$ or mixtures thereof, wherein M is a divalent metal selected from the group consisting of Mg, Ca, Sr, Ba, Mn, Cr, Co, Ni, Mg, Zn, Cd and mixtures thereof, more preferably M is at least one of Mg, Zn, Mn or Co, and particularly preferred M is MG or Zn. Some examples of suitable vanadites include magnesium vanadite, cobalt vanadite, nickel vanadite, zinc vanadite, barium vanadite, strontium vanadite, manganese vanadite, calcium vanadite, cadmium vanadite, silver vanadite, zirconium vanadite, rare earth vanadites such as cerium vanadite or mixtures of vanadites. Examples of mixed vanadites are magnesium vanadite plus zinc vanadite, magnesium vanadite plus cobalt vanadite and magnesium vanadite plus manganese vanadite. The mixed vanadites can be physical mixtures of the vanadites or may contain crystals wherein the different metallic atoms are contained in the same crystal, or a combination of physical and chemical combinations.

The catalysts can have vanadium combined in crystalline structure with oxygen and more than one other metallic cation, as mentioned above. For example, a magnesium vanadite could have the formula $Me_aMg_bV_cO_4$, where Me could be any metal other than Mg or V and $a = 0 - 1.7$, $b = 0.3 - 2$ and $c = 1$ to 2. Some chemical compositions would be magnesium zinc vanadite, magnesium nickel vanadite, cobalt zinc vanadite, zinc chromium vanadite and the like.

Vanadite formation may be accomplished by reacting an active compound of vanadium with an active compound of the designated metals. By active compound is meant a compound which is reactive under the conditions to form the vanadite. Starting compounds of vanadium or the other metal may be such as the nitrates, hydroxides, hydrates, oxalates, carbonates, acetates, formates, halides, oxides, etc. The starting compounds are suitable oxides or compounds which will decompose to oxides during the formation of the vanadite such as organic and inorganic salts or hydroxides. For example, manganese carbonate may be reacted with vanadium oxide ($V_2O_3$) to form manganese vanadite. Salts of the desired metals may be coprecipitated and the precipitate heated to form the vanadite. Desired vanadites may be obtained by conducting the reaction to form the vanadite at relatively low temperatures, that is, at temperatures lower than some of the very high temperatures used for the formation of high purity vanadites shown by the previously cited Rogers et al reference. Good results, e.g., have been obtained by heating the ingredients to a temperature no more severe than equivalent to heating at 950°C or 1,000°C for 90 minutes and generally the maximum temperature will be less than 1,300°C and preferably less than 1,150°C. Generally the vanadites will be prepared by heating the components at 350° to 900°C for 1-5 hours.

It has been found that a catalyst comprising vanadium, phosphorous and third metal component as previously described and oxygen is a particularly preferred catalyst. The phosphorous should be present in an amount of from about 0.002 to 0.35 atom of phosphorous per atom of vanadium, and preferably between about 0.005 and 0.20 atom of phosphorous per atom of vanadium. The phosphorous will generally be present in an amount of about 0.2 to 16 weight percent based on the vanadium and other metals present. Among the advantages of the presence of phosphorous in the catalysts are improved reaction yields, increased catalysts life and catalysts stability.

The phosphorous can be incorporated with the other catalyst components initially or subsequent to the combination of the other catalyst components. The phosphorous can be incorporated by addition of, e.g., orthophosphoric acid, meta-phosphoric acid, pyrophosphoric acid, phosphorous pentoxide, methyl phosphate, amine phosphate, magnesium phosphate, nickel phosphate, zinc phosphate, cobalt phosphate, phosphorous oxychloride, etc.

One method for the preparation of the phosphorous containing catalyst is to mix a vanadite, i.e., magnesium vanadite with a solution of ortho-phosphoric acid. The resulting slurry can then be dried and pelleted or coated on a carrier and then dried.

If a carrier is utilized for the catalysts of the present invention, the amount of catalytic composition on the carrier will generally be within the range of about 5 to 75 weight percent of the total weight of the active catalytic material plus the carrier. Conventional carriers can be employed such as the aluminas, pumice, silicon carbide and the like. Diluents and binders may also be used. Unless stated otherwise, the compositions referred to in this application are the main active constituents of the dehydrogenation process during dehydrogenation and any ratios and percentages refer to the surface of the catalyst in contact with the gaseous phase during dehydrogenation.

The catalysts may be activated or regenerated by reducing with a reducing gas, e.g., such as hydrogen or hydrocarbons. For example, the preformed compositions may be reduced with, e.g., hydrogen at a temperature of at least 250°C. with the temperature of reduction generally being no greater than 850°C. The period of time for reduction will be dependent somewhat on the temperature of reduction.

The process of this invention may be applied to the dehydrogenation of a wide variety of organic compounds. Such compounds normally will contain from 2 to 20 carbon atoms, at least one

grouping, a boiling point below about 350°C, and such compounds may contain other elements, in addition to carbon and hydrogen such as oxygen, halogens, nitroen and sulfur. Preferred are compounds having 2 to 12 carbon atoms, and especially preferred are compounds of 3 to 6 or 8 carbon atoms.

Among the types of organic compounds which may be dehydrogenated by means of the process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustration of dehydrogenations include propionitrile to acrylonitrile; propionaldehyde to acrolein; ethyl chloride to vinyl chloride; methyl isobutyrate to methyl methacrylate; 2 or 3 chlorobutene-1 or 2, 3 dichlorobutane to chloroprene; ethyl pyridine to vinyl pyridine; ethylbenzene to styrene; isopropylbenzene to α-methyl styrene; ethylcyclohexane to styrene; cyclohexane to benzene; ethane to ethylene or acetylene; propane to propylene, methyl acetylene, allene, or benzene; isobutane to isobutylene; n-butane to butene and butadiene-1, 3; n-butene to butadiene-1, 3, and vinyl acetylene; methyl butene to isoprene; cyclopentane to cyclopentene and cyclopentadiene-1,3; n-octane to ethyl benzene and orthoxylene; monomethylheptanes to xylenes; ethyl acetate to vinyl acetate; 2,4,4-trimethylpentane to xylenes; and the like. This invention may be useful for the formation of new carbon to carbon bonds by the removal of hydrogen atoms such as the formation of a carbocyclic compound from two aliphatic hydrocarbon compounds or the formation of a dicyclic compound from a monocyclic compound having an acyclic group such as the conversion of propene to diallyl. Representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride 1,3 dichlorobutane, 1,4 dichlorobutane, the chlorofluorethanes, methyl pentane, methylethyl ketone, diethyl ketone, n-butyl alcohol, methyl propionate and the like.

Suitable dehydrogenation reactions are the following: Acyclic compounds having 4 to 5 non-quarternary contiguous carbon atoms to the corresponding olefins, diolefins or acetylenes having the same number of carbon atoms; aliphatic hydrocarbons having 6 to 16 carbon atoms and at least one quarternary carbon atom to aromatic compounds, such as 2,4,4-trimethylpentene-1 to a mixture of xylenes; acyclic compounds having 6 to 16 carbon atoms and no quarternary carbon atoms to aromatic compounds such as n-hexenes to benzene; cycloparaffins and cycloolefins having 5 to 8 carbon atoms to the corresponding olefin, diolefin or aromatic compound, e.g., cyclohexane to cyclohexene or cyclohexadiene or benzene; aromatic compounds having 8 to 12 carbon atoms including one or two alkyl side chains of 2 to 3 carbon atoms to the corresponding aromatic with unsaturated side chain such as ethyl benzene to styrene.

The preferred compounds to be dehydrogenated are hydrocarbons with a particularly preferred class being acyclic non-quarternary hydrocarbons having 4 to 5 contiguous carbon atoms or ethyl benzene and the preferred products are n-butene-1 or 2, butadiene-1,3, vinyl acetylene, 2-methyl-1-butene, 3-methyl-1-butene, 3-methyl-2-butene, isoprene, styrene or mixtures thereof. Especially preferred as feed are n-butene-1 or 2 and the methyl butenes and mixtures thereof such as hydrocarbon mixtures containing these compounds in at least 50 mole percent.

The dehydrogenation reaction may be carried out at atmospheric pressure, superatmospheric pressure or at sub-atmospheric pressure. The total pressure of the system will normally be about or in excess of atmospheric pressure, although sub-atmospheric pressure may also desirably be used. Generally, the total pressure will be between about 4 p.s.i.a. and about 100 or 125 p.s.i.a. Preferably, the total pressure will be less than about 75 p.s.i.a. and excellent results are obtained at about atmospheric pressure.

The organic compound to be dehydrogenated is contacted with oxygen in order for the oxygen to oxidatively dehydrogenate the compound. Oxygen may be fed to the reactor as pure oxygen, as air, as oxygen-enriched air, oxygen mixed with diluents, solid oxidants, and so forth. Oxygen may also be added in increments to the dehydrogenation zone. Although determinations regarding the mechanism of reaction are difficult, the process of this invention is an oxidative dehydrogenation process wherein the predominant mechanism of this invention is by the reaction of oxygen with the hydrogen released from the hydrocarbon.

The amount of oxygen employed may vary depending upon the result such as conversion, selectivity and the number of hydrogen atoms being removed. Thus, to dehydrogenate butane to butene requires less oxygen than if the reaction proceeds to produce butadiene. Normally oxygen will be supplied (including all sources, e.g., air to the reactor) in the dehydrogenation zone in an amount from about 0.2 to 1.5, preferably 0.3 to 1.2 moles per mole of $H_2$ being liberated from the organic compound. Ordinarily the moles of oxygen supplied will be in the range of from 0.2 to 2.5 moles per mole of organic compound to be dehydrogenated and for most dehydrogenations this will be within the range of 0.25 to 1.5 moles of oxygen per mole of organic compound.

Preferably, the reaction mixture contains a quantity of steam or diluent such as nitrogen with the range generally being between about 2 and 40 moles of steam per mole of organic compound to be dehydrogenated. Preferably, steam will be present in an amount from about 3 to 35 moles per mole of organic compound to be dehydrogenated and excellent results have been obtained within the range of about 5 to about 30 moles of steam per mole of organic compound to be dehydrogenated. The functions of the steam are several-fold, and the steam may not merely act as a diluent. Diluents generally may be used in the same quantities as specified for the steam. These gases serve also to reduce the partial pressure of the organic compound.

It is one of the advantages of this invention that halogen may also be present in the reaction gases to give excellent results. The presence of halogen in the dehydrogenation zone is particularly effective when the compound to be dehydrogenated is saturated, such as a saturated hydrocarbon. The halogen present in the dehydrogenation zone may be either elemental halogen or any compound of halogen which would liberate halogen under the conditions of reaction. Suitable sources of halogen are such as hydrogen iodide, hydrogen bromide and hydrogen chloride; alliphatic halides, such as ethyl iodide, methyl bromide, methyl chloride, 1,2-dibromo ethane, cycloaliphatic halides, ammonium iodide; ammonium bromide; ammonium chloride, sulfuryl chloride; metal halides including molten halides; and the like. The halogen may be liberated partially or entirely by a solid source as disclosed in the process of U.S. Pat. No. 3,130,241, issued Apr. 21, 1964. Mixtures of various sources of halogen may be used. The amount of halogen, calculated as elemental halogen, may be as little as about 0.0001 or less mole of halogen per mole of the organic compound to be dehydrogenated to as high as 0.2 or 0.5.

The temperature for the dehydrogenation reaction generally will be at least about 250°C, such as greater than about 300°C. or 375°C., and the maximum temperature in the reactor may be about 700°C or 800°C. or perhaps higher such as 900°C. under certain circumstances. However, excellent results are obtained within the range of or about 350°C. to 700°C., such as from or about 400°C to or about 675°C. The temperatures are measured at the maximum temperature in the dehydrogenation zone.

The gaseous reactants may be conducted through the reaction chamber at a fairly wide range of flow rates. The optimum flow rate will be dependent upon such variables as the temperature of reaction, pressure, particle size, and so forth. Desirable flow rates may be established by one skilled in the art. Generally the flow rates will be within the range of about 0.10 to 10 liquid volumes of the organic compound to be dehydrogenated per volume of dehydrogenation zone containing catalyst per hour (referred to as LHSV). Usually, the LHSV will be between 0.15 and about 5. For calculation, the volume of a fixed bed dehydrogenation zone containing catalyst is that original void volume of reactor space containing catalyst.

The process of this invention utilizes either a fixed bed or moving bed, such as fluidized catalyst reactor. Reactors which have been used for the dehydrogenation of hydrocarbons by non-oxidative dehydrogenations are satisfactory such as the reactors for the dehydrogenation of n-butene to butadiene-1,3. Although means to remove heat from the reactor may be employed such as coils, the invention is particularly useful in adiabatic reactors.

The following examples are only illustrative of the invention and are not intended to limit the invention. All percentages are weight percent unless specified otherwise. All conversions, selectivities and yields are expressed in mole percent of the designated feed.

EXAMPLE 1

Quantities of $NH_4VO_3$ and $MgCO_3$ were well mixed in a dry state to give a mole ratio of Mg to V of 2:1. The components were slurried in water and deposited on 7-9 mesh HCl leached alumina supports and dried.

50 cc of catalyst was charged to a vertical Vycor tube reactor, 40 cm in length and 30 mm in diameter. The temperature reported is the maximum temperature in the catalyst bed. A glass thermocouple well extended the length of the catalyst bed and a moveable thermocouple used to measure the tmperature at various positions in the bed. A feed of about 99 + % butene-2 (the remainder being butene-1 and n-butane) was dehydrogenated at a mole ratio of oxygen/steam/hydrocarbon of 0.5/5.0/1.0. The LHSV was 0.5. The results at several temperatures are set out below in Table I.

TABLE I

| Temperature °C | Butadiene Conversion (C) | Selectivity (S) | Yield (Y) |
| --- | --- | --- | --- |
| 700* | 38/ | 80/ | 30 |
| 750 | 58/ | 75/ | 43 |

*LHSV = 1.0

Although this catalyst performed well and is not known in the prior art, difficulty was noted in adhering the actives to the support as compared to the invention catalysts described below.

EXAMPLES 2-6

Several Mg-V-O catalysts were prepared by mixing various amounts of the dry ingredients and small amounts of $MgCl_2$ as solid state promoter. The ingredients were slurried in a 1 quart Waring blender using demineralized water as the slurrying medium. The mixture was dried and the dried cake crushed to a fine powder. Each set of catalyst ingredients was calcined at 500°C. for 5 hours and reduced with hydrogen at 550°C. for 1½ hours, then slurried with water and deposited on HCl leached 7-9 mesh alumina and dried. Using the apparatus described in Example 1 the butene-2 feed was dehydrogenated. The catalysts, reaction conditions and results are shown in Table II.

TABLE II

Mole ratio oxygen/steam/hydrocarbon = 0.5/5.0/1.0, LHSV = .5

| Example No. | Catalyst Mole Ratio Mg:V | Temperature °C | Butadiene Mole % | | |
| --- | --- | --- | --- | --- | --- |
| | | | C/ | S/ | Y |
| 2 | 1:2 | 760 | 49/ | 66/ | 32 |
| 3 | 1.5:1.5 | 750 | 45/ | 70/ | 32 |
| 4* | 1.5:1.5 | 760 | 45/ | 70/ | 32 |
| 5 | 2:1 | 700 | 44/ | 73/ | 32 |
| 6 | 2:1 | 760 | 62/ | 72/ | 45 |

*LHSV = 1.0

The catalyst of example 6 gave better results in the reaction than the corresponding uncalcined catalyst of Example 1. The calcined material was easily deposited on the support. The improvement in the case of the catalyst of Example 6 over that in Example 1 being not as noticeable in regard to the S/C/Y data of the tst runs but relates to the handlability of the material according to the invention as compared to the physical mixture of the precursor components of the vanadites. The improvement in yield in Example 6 may be attributable in part to the slightly higher operating temperature over Example 1, however, every improvement in a catalyst is not only relatable to increased yields. A catalyst such as that in Example 1 is of no value if the catalyst portion falls off the support material. The improved handling properties for the catalyst of the invention is totally unpredictable from the behavior of the catalyst of Example 1, and in any event the catalyst of Example 1 is also novel and applicant's invention.

EXAMPLES 7-11

Catalysts containing Mn, Co and Zn, (as $MCO_3$) in addition to vanadium were prepared in the same manner as the Mg-V catalysts of EXamples 2-6 i.e., slurried, dried, crushed, calcined, reduced and deposited on alumina using traces of $MnCl_2$, $CoCl_2$ and $ZnCl_2$ respectively as the solid state promotor. In Table III each catalyst and the mole ratio of metal to V based on the quantities of ingredients, are set out. The maximum temperatures of each dehydrogenation and the results are also set forth. The apparatus and butene-2 feed were the same as previously described.

TABLE III

Mole ratio Oxygen/Steam/Hydrocarbon = 0.5/5.0/1.0

| Example No. | Catalyst Metal Component | Mole ratio Metal : V | Temperature °C | Results Mole % | | |
| --- | --- | --- | --- | --- | --- | --- |
| | | | | C/ | S/ | Y |
| 7 | Mn | 1.0:2.0 | 750 | 41/ | 64/ | 26 |
| 8 | Mn | 1.5:1.5 | 750 | 42/ | 63/ | 26 |
| 9 | Mn | 2.0:1.0 | 750 | 42/ | 63/ | 26 |
| 10 | Co | 1.0:2.0 | 760 | 54/ | 59/ | 32 |
| 11 | Zn | 1.0:2.0 | 780 | 52/ | 72/ | 37 |

EXAMPLE 12

A Mg-V catalyst using quantities which gave a mole ratio of Mg:V of 2.0 : 1.0 was prepared by slurrying of $NH_4VO_3$, $MgCO_3$ ($MgCl_2$ trace), drying, crushing and calcining for 5 hours at 500°C. Three percent by weight of phosphoric acid was added (as 85% $H_3PO_4$), dried and the phosphorous containing Mg-V deposited on 7-9 mesh HCl leached alumina as previously described. The butene-2 feed was dehydrogenated at oxygen/steam/hydrocarbon of 0.5/5.0/1.0 and LHSV of 0.5 at 720°C and 750°C, the results were respectively, C/S/Y = 61/70/43 and 73/69/50.

EXAMPLES 13 and 14

A Mg-V catalyst prepared in the same manner as that of Example 12 was reduced with hydrogen for 1 hour at 550°C prior to use. Runs were made with this catalyst employing a small amount of halogen (HBr) with the described butene-2 feed. The conditions and results for each run are shown in Table IV.

TABLE IV*

| Example No. | Mole ratio HBr/Hydrocarbon | Max. Temp. °C | Results % Butadiene | | |
|---|---|---|---|---|---|
| | | | C/ | S/ | Y |
| 15 | 0.08/1.0 | 630 | 56 | 94 | 53 |
| 16 | 0.08/1.0 | 650 | 58 | 92 | 53 |

*Oxygen/Steam/Hydrocarbon = 0.5/5.0/1.0 LHSV = 0.5

EXAMPLE 15

A Zn-V catalyst was prepared by mixing quantities of $NH_4VO_3$ and $ZnCO_3$ to give a mole ratio of Zn:V of 1.0:2.0. A small quantity of $ZnCl_2$ was added as solid state promoter. The ingredients were slurried, dried, crushed and calcined for 5 hours at 500°C., slurried with 3 weight percent phosphoric acid, (as 85% $H_3PO_4$) dried, coated onto 7-9 mesh HCl leached alumina supports and reduced for 1 hour at 550°C. with hydrogen. The apparatus and butene-2 feed were those previously described. The conditions of the dehydrogenation were HBr/oxygen/steam hydrocarbon = 0.08/0.5/5.0/1.0, LHSV = 0.5. The C/S/Y of butadiene was 52/93/48 at 550°C.

EXAMPLE 16

A Li-V catalyst was prepared with appropriate quantities of $NH_4VO_3$ and $Li_2CO_3$ to give a mole ratio of Li:V of 1.0:2.0. The solid state promoter was LiCl (trace). The ingredients were slurried, dried, crushed, calcined for 5 hours at 500°C, reduced for 1½ hours at 550°C. in hydrogen, slurried with water, deposited on HCl leached alumina, dried, loaded into the Vycor reactor and the butene-2 feed added with oxygen and steam ($O_2$/steam/HC = 0.5/5.0/1.0, LHSV = 0.5). At the maximum temperature of 750°C. C/S/Y were 27/62/17.

EXAMPLE 17

The following Example is that appearing in U.S. Pat. No. 2,326,258 to Schmidt employing zinc vanadate and is presented for comparison with the spinel vanadium compositions of the present invention:

A mixture consisting of 1 part by volume of beta-butylene, from 0.8 to 3 parts by volume of carbon dioxide and 0.4 part by volume of oxygen is led at 540°C. through a tube made from V2A steel charged with zinc vanadate. The speed of flow is so chosen that from 160 to 300 parts by volume of butylene are passed per hour over 1 part by volume of the catalyst. The gases emerging from the tube are cooled to about 30°C. and then washed with water under superatmospheric pressure to remove carbon dioxide. After having removed small amounts of carbon monoxide, the gas is treated with an aqueous solution of cuprous chloride and ammonium chloride in order to separate the butadiene formed from unchanged butylene which is not absorbed and can be led back for further dehydrogenation.

In one throughput from 15 to 25 percent of butylene are thus converted into butadiene with a yield of 75 percent calculated on the amount of butylene converted.

If the results of Schmidt are set out as applicant's they show

| Example No. | Temperature °C. | Results mole % | | |
|---|---|---|---|---|
| | | C/ | S/ | Y |
| 17 | 540 | 25/ | 75/ | 18.7 |

In order to increase the conversion Schmidt could increase the temperature but selectivity would expectedly fall off. The present results should be viewed along with those of Example 11 employing the spinel.

The invention claimed is:

1. A process for the dehydrogenation of hydrocarbon compounds having 4 to 5 non-quaternary contiguous carbon atoms and having at least one

grouping or ethyl benzene to produce corresponding dehydrogenated compounds having the same number of carbon atoms as said compounds, said process comprising contacting in vapor phase at a temperature of greater than 250°C. a mixture of said compound or compounds to be dehydrogenated and from 0.2 to 2.5 moles of oxygen per mole of said compound or compounds to be dehydrogenated with a catalyst composition comprising crystalline spinel of the general formula $M_2VO_4$, $MV_2O_4$, between $MV_2O_4$ and $M_2VO_4$ or mixtures thereof wherein M is Mn.

2. The process according to claim 1 wherein the hydrocarbon compound to be dehydrogenated comprises a hydrocarbon having four carbon atoms.

3. The process according to claim 1 wherein the hydrocarbon has five carbon atoms.

4. The process according to claim 1 wherein said crystalline spinel has a face centered cubic form of structure.

5. A process for the dehydrogenation of butene-1, butene-2, or mixtures thereof, to produce corresponding dehydrogenated compounds having the same number of carbon atoms as said compounds, said process comprising contacting in vapor phase at a temperature of greater than 250°C. a mixture of said compound or compounds to be dehydrogenated and from 0.2 to 2.5 moles of oxygen per mole of said compound or compounds to be dehydrogenated with a catalyst composition comprising crystalline spinel of the general formula $M_2VO_4$, $MV_2O_4$, between $MV_2O_4$ and $M_2VO_4$ or mixtures thereof wherein M is Mn.

6. A process for the dehydrogenation of hydrocarbon compounds having 4 to 5 non-quaternary contiguous carbon atoms and having at least one

grouping or ethyl benzene to produce corresponding dehydrogenated compounds having the same number of carbon atoms as said compounds, said process comprising contacting in vapor phase at a temperature of greater than 250°C. a mixture of said compound or compounds to be dehydrogenated and from 0.2 to 2.5 moles of oxygen per mole of said compound or compounds to be dehydrogenated with a catalyst composition comprising crystalline spinel of the general formula $M_2VO_4$, $MV_2O_4$, between $MV_2O_4$ and $M_2VO_4$, or mixtures thereof wherein M is Zn.

7. The process according to claim 6 wherein said catalyst composition contains phosphorous.

8. The process according to claim 7 wherein the hydrocarbon compound to be dehydrogenated comprises a hydrocarbon having four carbon atoms.

9. The process according to claim 8 wherein the hydrocarbon compound to be dehydrogenated comprises butene-1, butene-2 or mixtures thereof.

10. The process according to claim 8 wherein the said mixture of hydrocarbon compounds to be dehydrogenated and oxygen contains about 0.0001 to 0.5 mole of halogen per mole of hydrocarbon to be dehydrogenated.

11. The process according to claim 10 wherein said mixture of hydrocarbons to be dehydrogenated and oxygen contains about 0.0001 to 0.2 mole of halogen per mole of hydrocarbon to be dehydrogenated.

12. The process according to claim 7 wherein the hydrocarbon compound to be dehydrogenated has five carbon atoms.

13. A process for the dehydrogenation of hydrocarbon compounds having four carbon atoms and at least one

grouping to produce corresponding dehydrogenated compounds having the same number of carbon atoms as said compounds, said process comprising contacting in vapor phase at a temperature of greater than 250°C. a mixture of said compound or compounds to be dehydrogenated, from 0.2 to 2.5 moles of oxygen and 0.0001 to 0.2 mole of bromine per mole of said compound or compounds to be dehydrogenated with a catalyst composition comprising phosphorus and a crystalline spinel of the general formula $M_2VO_4$, $MV_2O_4$, between $MV_2O_4$ and $M_2VO_4$ or mixtures thereof wherein M is Zn.

14. A process for the dehydrogenation of hydrocarbon compounds having four to five non-quaternary contiguous carbon atoms and having at least one

grouping or ethyl benzene to produce corresponding dehydrogenated compounds having the same number of carbon atoms as said compounds, said process comprising contacting a vapor phase at a temperature of greater than 250°C. a mixture of said compound or compounds to be dehydrogenated and from 0.2 to 2.5 moles of oxygen per mole of said compound or compounds to be dehydrogenated with a catalyst composition comprising crystalline spinel of the general formula $M_2VO_4$, $MV_2O_4$, between $MV_2O_4$ and $M_2VO_4$ or mixtures thereof wherein M is Co.

15. The process according to claim 14 wherein the hydrocarbon compound to be dehydrogenated comprises a hydrocarbon having four carbon atoms.

16. The process according to claim 15 wherein the hydrocarbon compound to be dehydrogenated is butene-1, butene-2 or mixtures thereof.

17. The process according to claim 14 wherein the hydrocarbon has five carbon atoms.

18. The process according to claim 14 wherein said crystalline spinel has a face centered cubic form of structure.

19. A process for the dehydrogenation of butene-1, butene-2, or mixtures thereof, to produce corresponding dehydrogenated compounds having the same number of carbon atoms as said compounds, said process comprising contacting in vapor phase at a temperature of greater than 250°C. a mixture of said compound or compounds to be dehydrogenated and from 0.2 to 2.5 moles of oxygen per mole of said compound or compounds to be dehydrogenated with a catalyst composition comprising crystalline spinel of the general formula $M_2VO_4$, $MV_2O_4$, between $MV_2O_4$ and $M_2VO_4$ or mixtures thereof wherein M is Co.

* * * * *

PO-1050
(5/69)

UNITED STATES PATENT OFFICE
CERTIFICATE OF CORRECTION

Patent No. 3,856,881     Dated Dec. 24, 1974

Inventor(s) Harold E. Manning

It is certified that error appears in the above-identified patent and that said Letters Patent are hereby corrected as shown below:

Col. 1, line 30 reads "Hackle's" but should read --- Hackh's ---.
Col. 4, line 48 reads "nitroen" but should read ---nitrogen ---.
Col. 8, line 33 reads "tst runs" but should read --- test runs ---.
Col. 8, lines 41 and 42 read "catalyst portion" but should read --- catalytic portion ---.
Col. 9, line 25, (Columnar heading) reads "    Results    " but should
read ---    Results     ---.
       % Butadiene
    mole % Butadiene

UNITED STATES PATENT OFFICE
CERTIFICATE OF CORRECTION

Patent No. 3,856,881  Dated December 24, 1974

Inventor(s) Harold E. Manning

It is certified that error appears in the above-identified patent and that said Letters Patent are hereby corrected as shown below:

Col. 1, line 20 reads "Mo, B and Ce" but should read --- Mo, Bi and Ce ---.

Signed and sealed this 8th day of April 1975.

(SEAL)
Attest:

RUTH C. MASON
Attesting Officer

C. MARSHALL DANN
Commissioner of Patents
and Trademarks